June 27, 1961 R. C. MIERENDORF 2,990,500

ELECTRONIC MODULE

Filed March 16, 1959

INVENTOR.

ROBERT C. MIERENDORF

BY

William H. Schmeling

United States Patent Office 2,990,500

Patented June 27, 1961

2,990,500
ELECTRONIC MODULE

Robert C. Mierendorf, Wauwatosa, Wis., assignor to Square D Company, Detroit, Mich., a corporation of Michigan Filed Mar. 16, 1959, Ser. No. 799,604
6 Claims. (Cl. 317—101)

This invention relates to electronic apparatus construction and is more particularly concerned with an arrangement whereby a tube socket and the circuit components associated with the tube which is positioned in the socket are arranged to provide a unit or module assembly which may be readily mounted in a device and connected to other similar modules in the device.

The production of electronic and electrical equipment today is limited by the hand assembly and connection of mechanically produced components, such as resistors, capacitors and rectifiers, to each other and to other components in the complicated circuits used in electronic devices. These complete and complicated electronic devices are frequently formed of a plurality of similar circuits each of which is frequently associated with an electronic tube.

The modular assembly according to the present invention is particularly suited for use with modern assembly practices wherein the various components of a device are formed as sub-assemblies at various spaced locations in the factory and transported to an assembly area where they are connected to other sub-assemblies to form a completed device. The module frame according to the present invention will provide a mounting for mass produced electrical components, i.e., resistors, capacitors and rectifiers, as received from the suppliers without special preparations to their terminal or lead wires and is usable with standard readily available sockets for the electronic tubes. Further, the module will permit the various circuit components to be mechanically positioned and electrically interconnected to each other and to the tube socket to present a uniform appearance when assembled without dependence upon the skill of the assembler.

The above will permit the modules to be fabricated, inspected and stored prior to final assembly and will simplify the drawings which have been heretofore necessary in the manufacture of electrical devices.

It is an object therefore to provide a module assembly incorporating the foregoing features and advantages.

Further objects and features of the invention will be readily apparent to those skilled in the art from the specification and appended drawing illustrating certain preferred embodiments in which.

Figures 1, 2, 3:
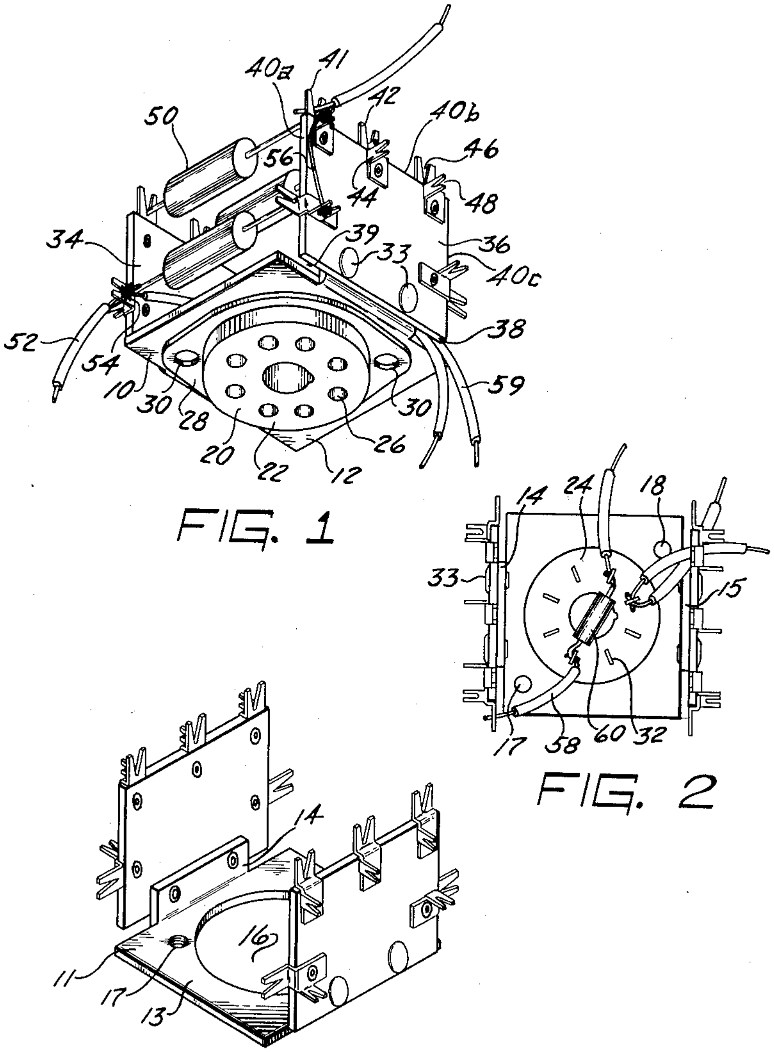
FIG. 1 is a perspective view of the module frame according to the present invention with the circuit components and tube socket assembled thereon.
FIG. 2 is a top plan view of the module assembly in FIG. 1.
FIG. 3 is a perspective view of the module frame as used in FIG. 1.

In the drawings, the numeral 10 indicates a metal base plate which is preferably formed of sheet metal material. The base plate 10 has a top surface 11 and a bottom surface 12 as defined by a substantially rectangular central portion 13. Extending upwardly from the top surface 11 on opposite sides of the central portion 13, are a pair of spaced parallel flanges 14 and 15. The central portion 13 has a relatively large opening 16 centrally located therein. Also located in the central portion are a pair of spaced openings 17 and 18.

The tube socket 20 which is of conventional design to provide a mounting for a vacuum tube, not shown, is preferably formed to have a cylindrical body of insulating material defining a bottom surface 22 and a top surface 24. Located in the bottom surface 22 are suitably located openings 26 which are arranged to receive the pins on the tube to be mounted therein. Located between the top surface 24 and the bottom surface 22 is a metal mounting flange having mounting openings 30 therein. The openings 30 and the openings 17 and 18 in the metal base plate are arranged to be aligned with each other to permit a fastening means, not shown, to be inserted therethrough and into a support, not shown, to simultaneously secure the metal base plate 10 and the tube socket 20 in position on the metal support. Extending upwardly from the top surface 24 of the tube socket 20 are metal terminals 32 which are electrically connected with suitable metal inserts, not shown, located in the openings 26. The metal inserts in the openings 26 are arranged to electrically engage the pins on the electronic tube to complete the electrical circuit between the terminals 32 and the pins of the tube.

Suitably secured to the flanges 14 and 15, as by means of rivets 33, are sheets 34 and 36. The sheets 34 and 36 are rectangular in shape and formed of a suitable insulating material. The sheets 34 and 36 are respectively secured to flanges 14 and 15 with the bottom edge 38 of the sheets 34 and 36 spaced from and contiguous to the top surface 11. As clearly seen in the drawings, the flanges 14 and 15 do not extend over the entire edge of the central portion 13. Thus, between the bottom edge 38 of the sheets 34 and 36 and the top surface 11, an opening 39 is provided. The purpose of this opening will be hereinafter explained. Suitably secured along the non-contiguous edges **40*a*, 40*b*, and 40*c* of the sheets 34 and 36, are metallic terminals 41. The terminals 41 are spaced along the respective edges and preferably are disposed on the respective sheets 34 and 36 to provide complementary pairs of terminals on the respective sheets. Each of the terminals 41 has a portion 42 extending parallel to the major surfaces of the sheets and projects above the edge along which the terminals 41 is mounted. The terminals are also provided with portions 44 which extend perpendicular to the major surfaces of the sheets. Located in each of the respective portions 42 and 44 are notches 46 and 48**.

As clearly seen in FIG. 1 of the drawings, electrical components 50, such as resistors, capacitors, or rectifiers, are positioned in the notches 46 in the complementary terminals 41 along the respective edges **40*a*, 40*b*, and 40*c*. The complementary nature of the terminals will permit the components, which are shown as resistances in the drawings, to be oriented parallel with one another. The notches 46 in the portions 44 of the terminals will permit the lead wire ends of the components 50 to be inserted therein and held securely prior to soldering. Also, if desired, leads 52 may be secured in the same notch wherein the terminal ends of the components 50 are located. The lead 52 may be utilized to interconnect the module shown in the drawing with other similar modules when the modules are assembled in electronic devices. The portions 44 of the terminals 41 provide securements for electrical leads 56 electrically interconnecting terminals to each other. The numeral 58 is used to designate a lead which connects the terminals 41 to terminals 32 on the tube socket and the numeral 59 is used to designate a lead to one of the terminals 32 on the tube socket which extends through the opening 39. In this connection it is to be noted that the space between the edge 38 and the top surface 11 preferably is dimensioned to tightly receive the lead 59. This will prevent unwarranted stress upon the terminals 32 when the leads 59 are manipulated during assembly of the module in other devices. The numeral 60 is used to designate an electrical component; for example, a resistor which may be connected between the terminals 32** on the tube socket. In this connection it is to be noted that the arrangement of parts will position the terminals 32 in the space between the sheets 34 and 36. This arrangement will protect the electrical connections to the terminals 32 during storage and assembly of the device shown in the drawing. If desired, the leads connected to the terminals 32 and the components 50 and leads 52, 58 and 59 may be secured, as by solder 54. It is clearly apparent that this soldering operation may be readily performed, as areas where solder is to be applied are readily available. Thus the soldering operation can be accomplished by anyone relatively unskilled in the art.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

What is claimed is:

1. A circuit assembly incorporating means for mounting and electrically interconnecting the components of an electronic tube circuit which tube has a plurality of spaced pins extending from one end, comprising; a socket for the tube having; a cylindrical body of insulating material defining a pair of spaced parallel surfaces, a plurality of openings in one of said surfaces each arranged to receive one of the pins of the tube, each of said openings having a metallic insert therein arranged to engage and electrically connect the pin received therein with an electrical tab extending from the other surface of the socket, a flange intermediate and parallel to the said surfaces said flange having a pair of spaced openings therein for attaching the socket to a support, a rectangular base having a central opening for receiving the cylindrical body of the socket and a pair of spaced openings alignable with the openings in the flange for attaching the base and socket to a support, a pair of parallel spaced perpendicular flanges on opposed sides of the base each extending in similar directions from the base on planes spaced from and normal to the other surface, said flanges having a shorter length than the sides of the base on which they are formed a rectangular sheet-like member of insulating material secured to each of the flanges, said members extending from the base in similar directions and having an edge of greater length than the length of the flanges and disposed contiguous to and spaced from the base, a plurality of tabs secured to the members in spaced relation about the noncontiguous edges of the members, said tabs each having V-shaped notches extending normal to the edge along which the tab is positioned providing securements for the electrical components including terminal ends of lead wires included in the circuit for the tube.

2. An assembly for mounting and providing electrical interconnections for electrical components of a circuit for an electronic tube, comprising; a sheet metal member having a pair of spaced parallel upstanding flanges extending along only a portion of the opposed edges of a central base portion, a sheet of insulating material secured to each of the flanges, each of said insulating sheets having an edge of substantially equal length to the edges of the base portion and spaced from and contiguous to the base portion to provide spaces between the edges of the base and sheets and flanges on opposed sides of the base, a plurality of spaced metal tabs secured to the insulating sheets along the non-contiguous edges thereof, a tube socket positioned in an opening in the metal base portion, a flange on the tube socket having; a pair of spaced openings therein alignable with a pair of spaced openings in the base portion, said pairs of openings in the base portion and flange being arranged to receive securing elements for simultaneously securing the tube socket and sheet metal member to a support, electrical tabs extending from a surface of the tube socket into a space between the insulating sheets, a V-shaped notch in each of the tabs on said insulating sheets, said notches providing securements for the electrical components including resistors connected with a circuit for the tube and the terminal ends of lead wires between the tabs on the socket and said components.

3. The combination as recited in claim 2 wherein the space between the contiguous edge of the insulating member and the base portion provides clearance for electrical leads to the tabs on the tube socket.

4. The combination as set forth in claim 2 wherein the tabs on the insulating members are soldered to leads from the electrical components.

5. The combination as recited in claim 2 wherein the tabs on the insulating sheets are arranged so the circuit components secured thereto are substantially parallel.

6. The combination as recited in claim 2 wherein the tabs secured to the insulating sheets have portions extending parallel to the sheets for securing the electrical components and portions extending perpendicular to the sheets for providing points of securement for connectors electrically interconnecting certain of said tabs.

References Cited in the file of this patent

UNITED STATES PATENTS 2,855,580 Tijs ---------------------- Oct. 7, 1958

FOREIGN PATENTS 925,718 France ------------------ Sept. 11, 1947

OTHER REFERENCES

Electronic Design, October 1955, pages 38 and 39.